United States Patent [19]

Hashimoto

[11] Patent Number: 5,138,652
[45] Date of Patent: Aug. 11, 1992

[54] MULTIFUNCTIONAL TELEPHONE ANSWERING DEVICE

[75] Inventor: Kazuo Hashimoto, Tokyo, Japan

[73] Assignee: Hashimoto Corporation, Tokyo, Japan

[21] Appl. No.: 637,864

[22] Filed: Jan. 8, 1991

[30] Foreign Application Priority Data

Mar. 15, 1990 [JP] Japan .................. 2-64791

[51] Int. Cl.$^5$ .............................................. H04M 1/64
[52] U.S. Cl. ........................... 379/67; 379/88; 379/79
[58] Field of Search .............. 379/67, 88, 81, 82, 379/79

[56] References Cited

U.S. PATENT DOCUMENTS

| | | | |
|---|---|---|---|
| 4,049,916 | 9/1977 | Danner | 379/76 |
| 4,640,990 | 2/1987 | Kawade et al. | 379/79 |
| 4,737,979 | 4/1988 | Hashimoto | 379/79 |
| 4,975,940 | 12/1990 | Hashimoto | 379/82 |

FOREIGN PATENT DOCUMENTS 2160390A 6/1985 United Kingdom .

OTHER PUBLICATIONS

J. Gilder, *More Telephone Accessories You Can Build*, Hayden Book Company, Inc. (1980).

*Primary Examiner*—Jin F. Ng
*Assistant Examiner*—Huyen D. Le
*Attorney, Agent, or Firm*—Lowe, Price, LeBlanc & Becker

[57] ABSTRACT

A conventional telephone answering device (hereinafter called TAD) commonly available in the market does not work if a child picks up the handset of a telephone set half in fun during the particular period when a call signal is received but the TAD is not started yet. The TAD also does return to a stand-by mode, on the other hand, if he or she picks up the handset while the TAD is in operation after receiving a call signal. In the present invention, however, it is so arranged that even if a child picks up the handset of a telephone set half in fun, the TAD will start transmitting an outgoing message to a calling party as long as the handset is hung up within a predetermined time period, and if the handset is picked up while the TAD is in operation but hung up within a predetermined time period, the TAD will continue the operation without being suspended. Moreover, due to the changeover switch, the TAD of the present invention can perform the function same as that of the conventional TAD regardless of the on-hook or off-hook condition of the handset. The changeover switch is installed at a location where it can be seen from the outside, but is structurally protected from a child.

6 Claims, 5 Drawing Sheets

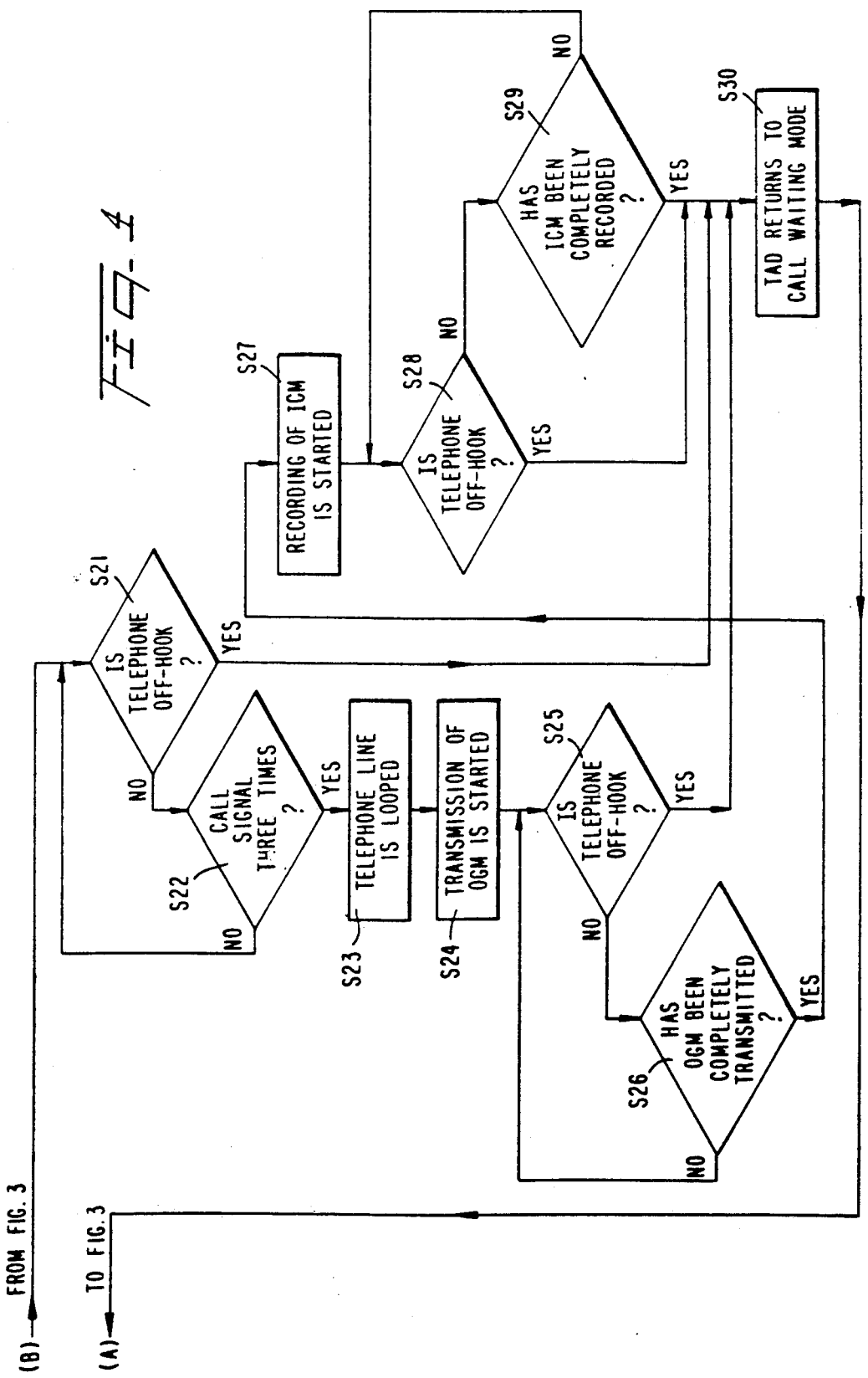

MULTIFUNCTIONAL TELEPHONE ANSWERING DEVICE

BACKGROUND OF THE INVENTION

The present invention relates to a telephone usable with a telephone answering device in pair.

Heretofore, telephone answering devices (hereinafter called TAD) connected to existing telephones in parallel or a combination of them have been widely used. However, if a called party keeps the telephone off the hook expecting a calling party to be one of its family members while a call signal is being received or the TAD is in operation by the call signal, the TAD will immediately return to a stand-by mode and hence becomes undependable with respect to the answering operation thereafter.

As set forth above, the TAD does not operate or stops operating and returns to a stand-by mode when an infant, for instance, keeps the telephone off the hook, i.e., the telephone connected to the TAD in parallel, while a call signal is being received or the TAD is in operation by the call signal. Even though an adult family member hastens to take up the handset then, the telephone call has been cut off. The problem, which is important in this case, is that the telephone call from the calling party is disconnected because of the TAD thus installed.

SUMMARY OF THE INVENTION

In order to solve the foregoing problems, an object of the present invention is to provide a means for completely preventing the start and continuance of the operation of the TAD from being obstructed by actuating a timer for measuring intervals of time (e.g., three seconds) within which an adult family member is supposed to set the telephone on the hook even an infant or the like is accessible to the telephone connected to the TAD in parallel so that it can be set off the hook while a call signal is being received or the TAD is in operation by the call signal. The TAD then stops operating after the passage of the set time interval, thus enabling a telephone call to be put through only by means of parallel telephones.

BRIEF DESCRIPTION OF THE DRAWINGS

FIGS. 3 and 4 are flowcharts illustrating the operation of the first embodiment.

DESCRIPTION OF THE PREFERRED EMBODIMENTS

Figure 1:
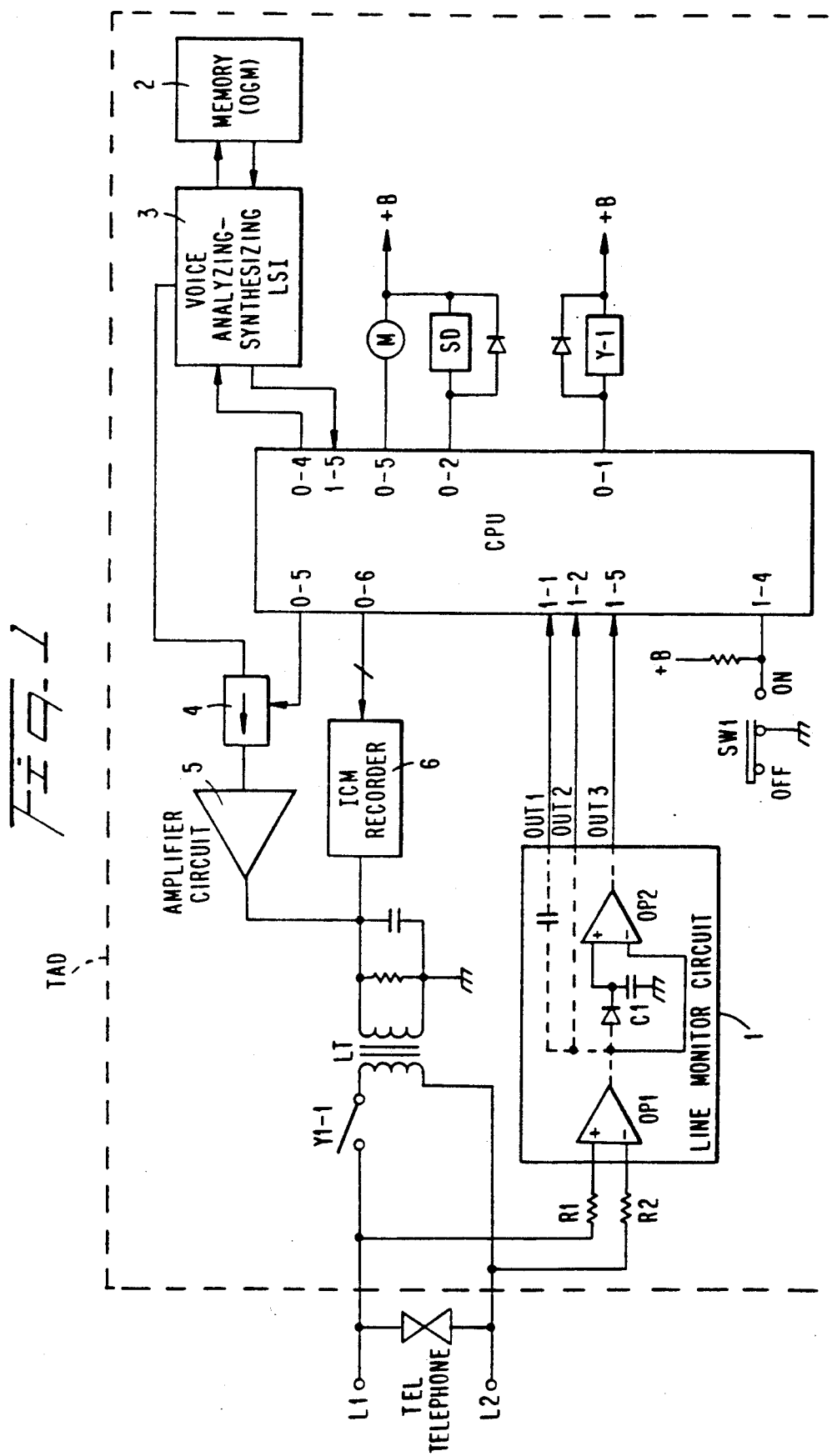
FIG. 1 is a block diagram showing the first embodiment of the present invention applied to a telephone answering device and a telephone which are provided independent of each other.

A description will subsequently be given of the first and the second embodiments of the present invention in terms of their constructions and functions. (1) In FIG. 1 illustrating the first embodiment, L1 and L2 refer to telephone lines, TEL to a telephone and TAD to a telephone answering device, and the TEL and the TAD are independent of each other. In the TAD, a line monitor circuit 1, though illustrated in a simplified form, is connected to the telephone lines via resistors R1 and R2 having high resistance values, the line monitor circuit being used for detecting the variation of the (telephone) line voltage caused by a call signal from a central telephone exchange and the on-/off-hook condition of the TEL connected to said TAD in parallel. An a.c. signal as the call signal is taken from an output terminal OUT1. The output detected from the on-/off-hook condition of the telephone as a single body is taken from an output terminal OUT2. The output detected from the on-/off-hook condition of the telephone with the TAD in operation is taken from an output terminal OUT3. The TAD further includes a 1-chip microprocessor CPU containing programs in the form of a ROM, input ports I-1-I-5, output ports O-1-O-6, a slide switch SW1 as a changeover switch for validating or invalidating a timer, which will be described later, to be operated when the telephone is set on-/off-the-hook, a memory 2 for recording an outgoing message (OGM) in the form of a digital signal, a voice analyzing-synthesizing LSI 3 for converting the OGM stored in the memory into an analog audio signal, an analog switch 4, an amplifier circuit 5, an ICM recorder 6 for recording an incoming message (ICM) from a calling party, the ICM recorder employing a cassette tape, a motor M for driving the cassette tape, a solenoid SD for switching the operation of the cassette tape, and a relay Y-1 for looping telephone lines when the call signal is detected, the relay having a contact Y1-1.

Figure 3:
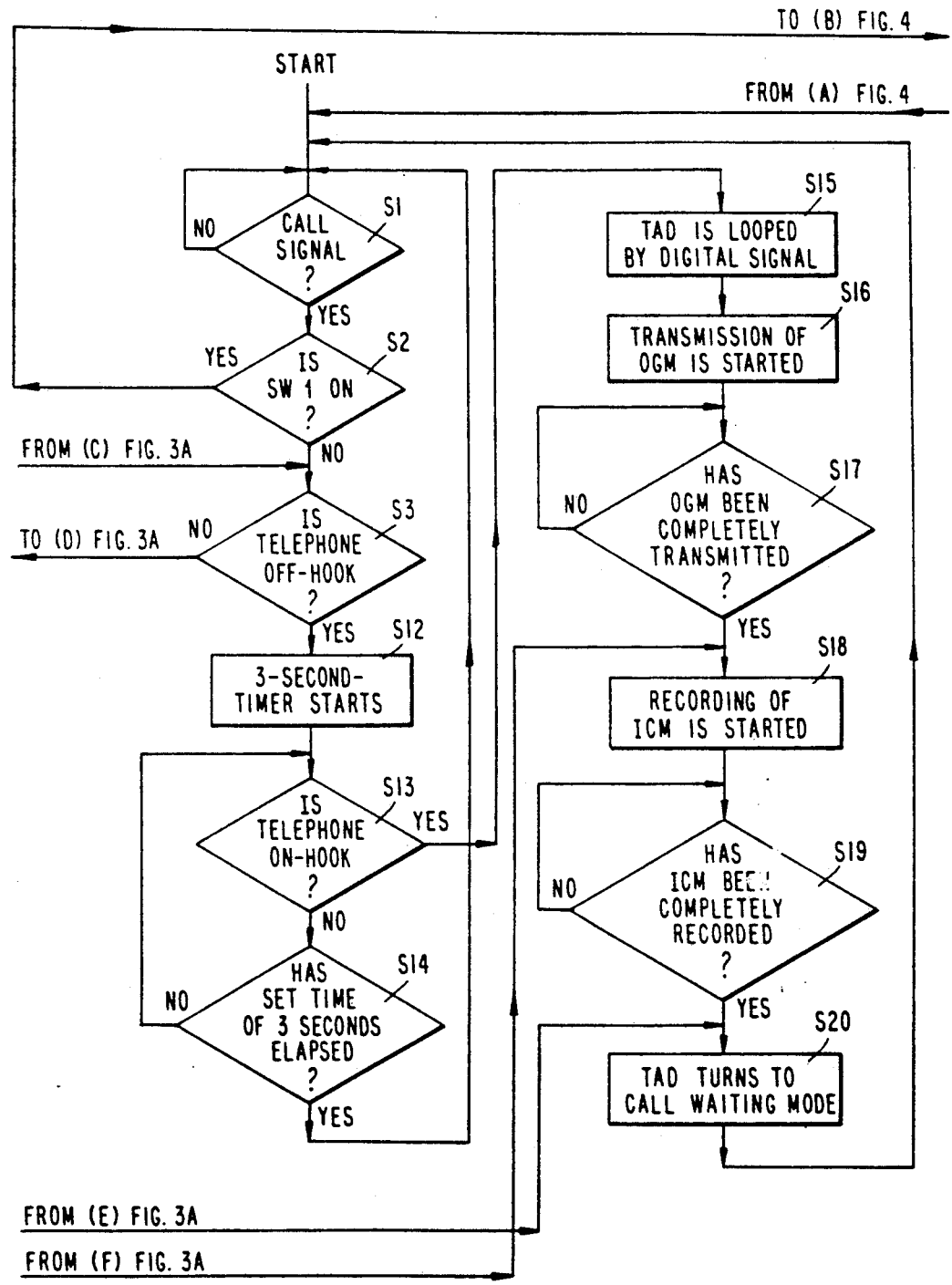
Figure 3A:
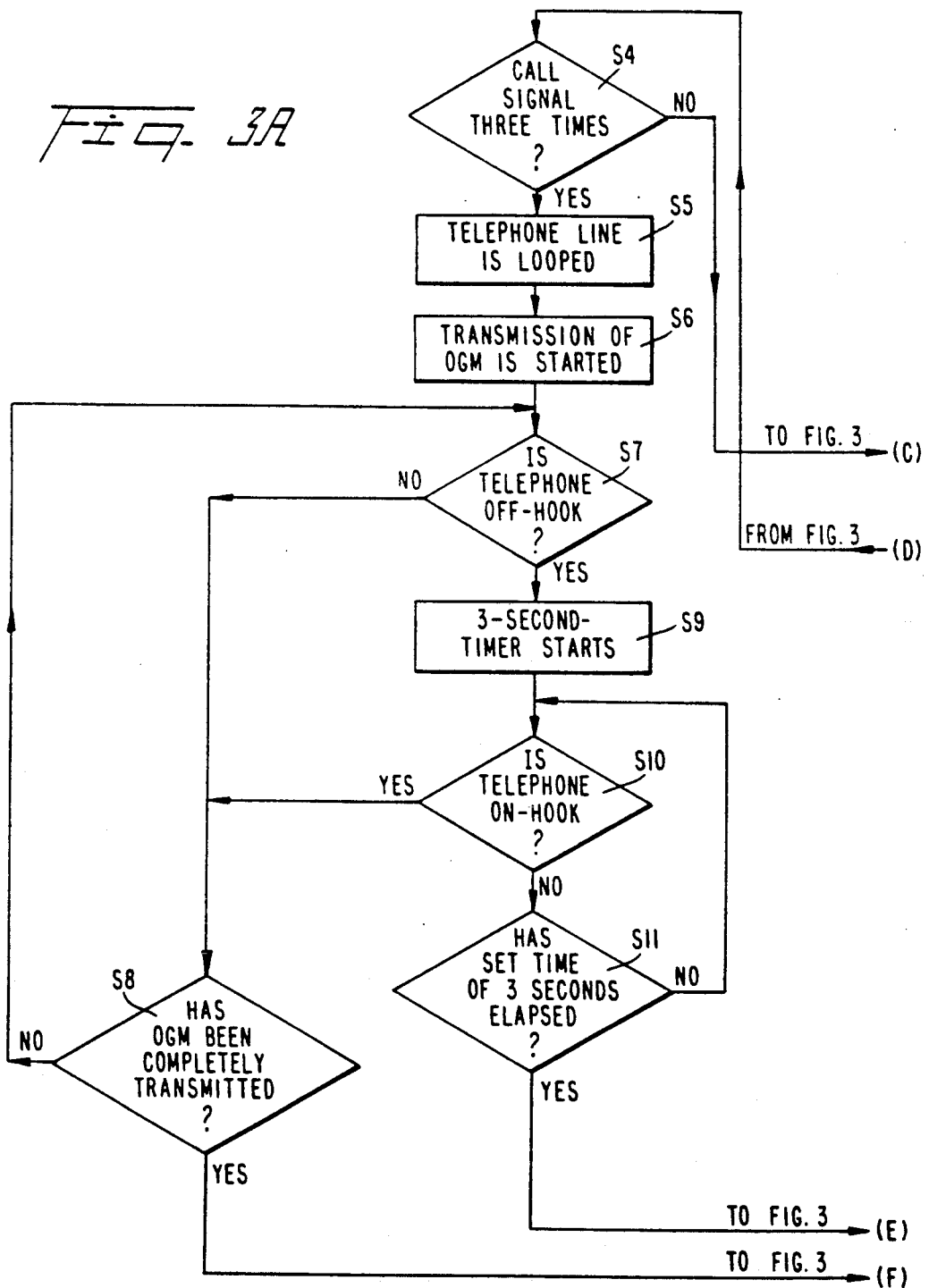

The first embodiment shown will subsequently be described in concrete with reference to flowcharts of FIGS. 3 and 4. When the call signal is received from the central telephone exchange via the telephone lines L1 and L2, it is applied via the resistors R1 and R2 to the line monitor circuit 1. The call signal is also applied from the OUT1 via an operational amplifier OP1 to the input port I-1 of the CPU. In this case, the CPU proceeds to STEP S2 when it decides the signal applied to the input port I-1 in STEP S1 to be the a.c. signal as the call signal. An item-to-item description will further be given of respective states wherein the off-hook condition of the telephone is present or absent and wherein the timer SW1 is turned on.

a. Description of the operation of the TEL being not set off the hook

In STEP S2, a test is made to see whether the switch SW1 is held on or off. If the SW1 is held on, the 3-second timer will be canceled as described later. When SW1 is held off, STEP S3 is followed. If the telephone is not set off the hook in this case, STEP S4 is followed. When the call signal is repeatedly input three times, the condition of STEP S4 is satisfied and STEP S5 is followed. By holding the relay Y-1 of FIG. 1 on, the telephone lines L1 and L2 are looped via the contact Y1-1 and a line transformer LT, so that the call signal is suspended. In STEP S6, the outgoing message (OGM) pre-recorded via the voice analyzing-synthesizing LSI 3 according to the instructions given through the output port O-4 of the CPU is read from the memory 2 and the transmission thereof to the calling party is started via the analog switch 4, the amplifier circuit 5 and the line transformer LT. The termination of the transmission of the outgoing message (OGM) in STEP S8 can be detected by detecting the output of the voice analyzing-synthesizing LSI 3 via the input port I-5 of the CPU. In the mean time, the testing of the off-hook condition of the telephone in STEP S7 is looped. When the outgoing message is completely transmitted with the TEL being not off the hook, STEP S18 is followed and the mode is switched over to the one is which the message (ICM) from the calling party is recorded. In other words, the motor M and the solenoid are driven to feed the cassette tape (not shown) in the ICM recorder at constant speed. The ICM recorder is thus switched over to the recording mode according to the instructions given through the output port O-6 and the recording of the message from the calling party on the cassette tape is started. The recording operation is terminated when the termination of the recording of the message from the calling party is detected by a voice control circuit (not shown) (STEP S19).

Then the motor M, the solenoid SD, the relay Y-1 and the like are released (STEP S20) and the TAD returns to the stand-by mode in STEP S1.

b. Description of the operation of the TEL being set off the hook while the call signal is received As STEP S3 and STEP S4 are looped until the telephone lines are looped by the contact Y1-1 of the relay Y-1 with the call signal sent in three times after the call signal is received, the off-hook condition of the telephone can be detected via the line monitor circuit 1. Since the call signal stops when the TEL is set off the hook, the TEL is recognized as being off-hook. This satisfies the condition of STEP S3, and then STEP S12 is followed. The 1-chip CPU contains the timer to be controlled by a program and starts the 3-second timer in STEP S12 in this embodiment. The on-hook condition of the TEL is tested via the line monitor circuit 1 and the input port I-3 in STEP S13 until a predetermined period of the 3-second timer elapses in STEP S14.

However, if the TEL remains off the hook after the lapse of three seconds, the condition of STEP S14 is satisfied and STEP S1 is followed again, so that the TAD returns to the stand-by mode wherein it awaits the next call signal.

Since the TEL still remains off the hook, on the other hand, the telephone conversation with the calling party can be held.

If the TEL is set on the hook within three seconds of predetermined period set in STEP S14, the condition of STEP S13 is satisfied and STEP S15 is followed. Also, the TAD starts as described below. In other words, the relay Y-1 as a load is turned on via the output port O-1 under instructions form the CPU in STEP S15, and the telephone lines L1 and L2 are looped via the contact Y1-1. The transmission of the outgoing message is started in STEP S16 and when the transmission thereof is completed (STEP S17), the mode is switched over to the recording mode in which the message (ICM) from the calling party is recorded (STEP S18). When ICM is completely recorded (STEP S19), the TAD returns to the stand-by mode (STEP 20) and STEP S1 for awaiting the next incoming call is followed again.

Even if an infant keeps the TEL off the hook by mistake during the particular period when a call signal is received but the TAD is not operated yet, the TAD can be started by setting the TEL on the hook within three seconds. Moreover, the TEL is set off the hook to monitor the voice of a calling party when a call signal is received, and if a called party prefers not to talk to the calling party directly, the called party may set the telephone on the hook and leave answering to the TAD.

If the TEL is set off the hook before a call signal is received, it is possible to dial a call independently of the TAD.

c. Description of operation of the changeover switch SW1 being switched to the ON side When a call signal is received, the conditions of STEP S1 and STEP S2 are satisfied in order, and STEP S21 is followed via a terminal (B) of FIG. 4. In FIG. 4, the 3-second timer stated above becomes irrelevant and the TAD performs a standard operation. When the TEL is set off the hook in STEPs S21, S25 and S28, the TAD returns immediately to the stand-by mode and communication by TEL becomes possible.

Figure 2:
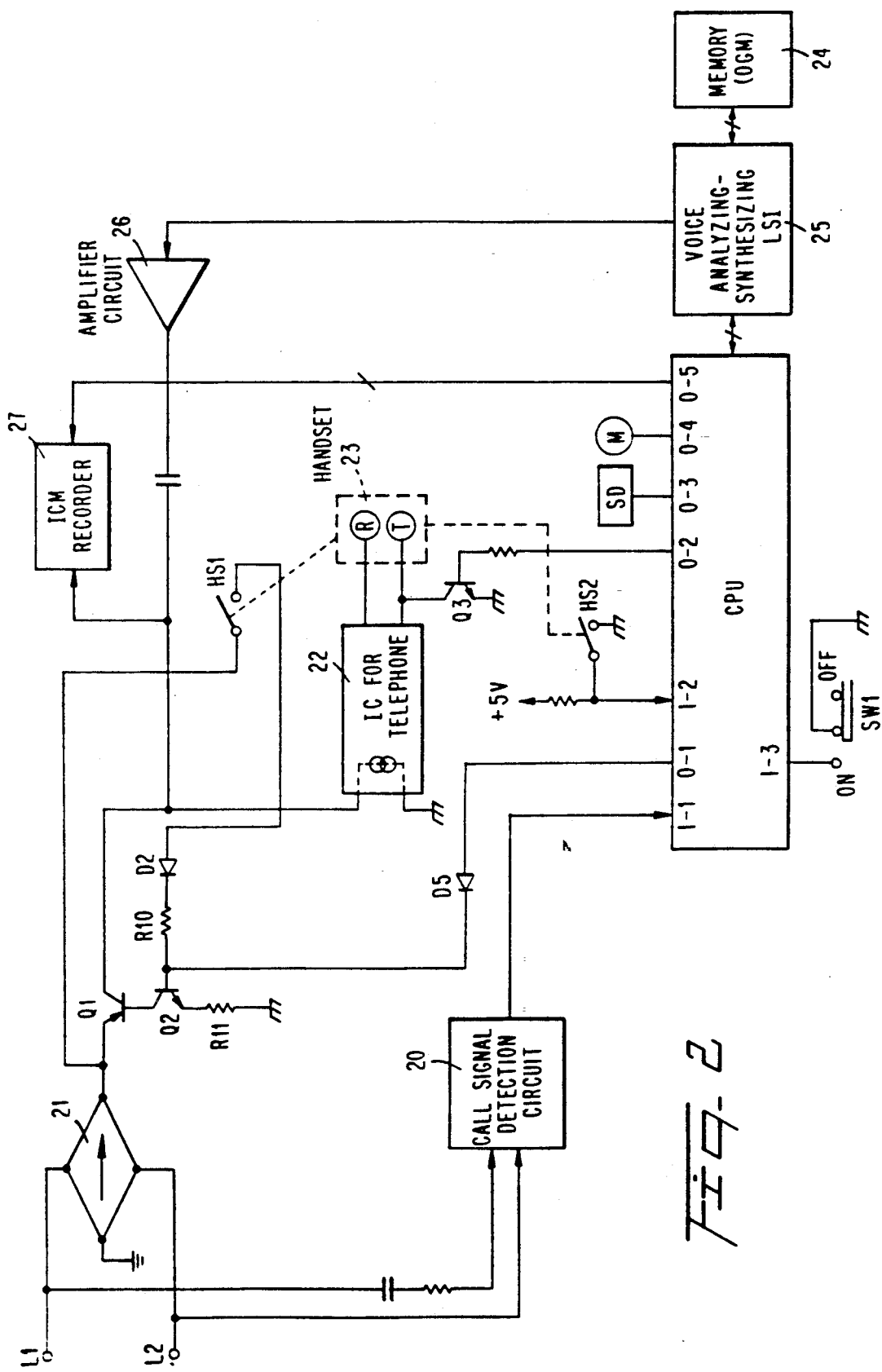
FIG. 2 is a block diagram showing the second embodiment of the present invention applied to a combination of a telephone answering device and a telephone.

(2) A description will subsequently be given of the second embodiment with reference to FIG. 2. In this second embodiment, a telephone answering device is incorporated with a telephone in the same housing. In FIG. 2, L1 and L2 refer to telephone lines, 20 to a call signal detection circuit, 21 to a diode bridge circuit, 22 to an IC for telephone, 23 to a handset, 24 to a memory for OGM, 25 to a voice analyzing-synthesizing LSI, 26 to an amplifier circuit, 27 to an ICM recorder, SW1 to a changeover switch whose function is similar to that of SW1 of FIG. 1, and HS1 and HS2 to hook switches interlocked with the handset 23.

When a call signal is received via the telephone lines L1 and L2 of FIG. 2, the call signal is detected by a program (not shown in the flow chart) via the call signal detection circuit 20 and the input port I-1 of the CPU, and the output from the output port O-1 causes transistors Q1 and Q2 to be held on via a diode D3.

In this case, the diode bridge 21, the transistor Q1 and an constant current circuit in the IC 22 for telephone constitute the closed circuit of the telephone lines, which stops the reception of the call signal. Subsequently under instructions from the CPU, the outgoing message (OGM) recorded in a memory 24 is sent to the telephone lines L1 and L2 via the voice anaylzing-synthesizing LSI 25, the amplifier circuit 26, the transistor Q1 and the diode bridge 21. When the outgoing message is completely transmitted, the solenoid SD and the motor M are energised as shown in FIG. 1 and a message (ICM) from a calling party is recorded in an ICM recorder 27. When the message recording is terminated, the stand-by mode is restored.

While the changeover switch SW1 whose function is similar to what is shown in FIG. 1 remains at the OFF position, the hook switches HS1 and HS2 interlocked with the handset 23 are close if the handset 23 is set off the hook before the TAD starts to loop the telephone lines on receiving the call signal. In this case, the voltage of the telephone line turns on the transistors Q1 and Q2 via he diode bridge 21, HS1, a diode D2 and a resistor R10, so that the telephone lines L1 and L2 are looped. The 3-second timer starts at this time as described in the first embodiment. Simultaneously, a H-level signal is output from the output port 0-2 for three seconds to turn on a transistor Q3 and to earth the microhone T of the handset 23, whereby the voice of any one who has set the handset off the hook is prevented from being heard by the calling party. However, the voice of the calling party can be monitored because the speaker R of the handset remains in operation. Even when the handset is set off the hook, not by a little child out of fun, to monitor the voice of the calling party, a sign of a called party is prevented from being sensed by the calling party. If the called party is in no mood to talk to the calling party directly after monitoring, the former may set the handset 23 on the hook within three seconds so as to start the TAD by the signal through the output port 0-1 as in the case of the first embodiment. The outgoing message is then sent to the calling party.

When the called party sets the handset 23 on the hook againg within three seconds after setting it off the hook while the outgoing message is being sent out or while the message from the calling party is being recorder, the TAD keeps functioning as it ought to function. When the called party otherwise sets the handset off the hook continuously for over three seconds, the TAD stops functioning and returns to the stand-by mode. However, a telephone conversation with the calling party can be held as the telephone lines are still looped via the hook switch HS1.

since the second embodiment is substantially similar in function to the first embodiment, the decription of its operation with reference to a flowchart is omitted. The operation with the changeover switch SW1 being turned off is also similar to that of the first embodiment. As the TAD is incorporated with the telephone in the second embodiment, the microphone of the handset can simply be made inoperative during the operation of rhe timer for three seconds.

What is claimed is:

1. A multifunctional telephone answering device which is activated in response to detection of a call signal from a central telephone exchange, comprising:

first detection means for detecting the on-/off-hook condition of a telephone set connected to telephone lines after a call signal from the central telephone exchange is received but before engagement of the lines by said telephone answering device;

first timer means responsive to said first detection means for starting a first timing period when said telephone is taken off-hook;

means responsive to said first detection means for starting an operation of said telephone answering device when said telephone set is placed on-hook before the first timing period of said first timer means has expired; and means responsive to said first detection means for inhibiting the operation of said telephone answering device if said telephone set remains off-hook after the first timing period of said first timer means has expired.

2. The multifunctiional telephone answering device of claim 1, further comprising:

second detection means for detecting the on-/off-hook condition of said telephone set after engagement of the lines by said telephone answering device;

second timer means responsive to said second detection means for starting a second timing period when said telephone set is taken off-hook; and means responsive to said second detection means for disengaging said telephone answering device from the lines if said telephone set is maintained off-hook after the second timing period of said second timer means has expired.

3. A multifunctional telephone answering device as claimed in claim 1 wherein said telephone answering device includes switch means for resetting said first timer means, and means for inhibiting the start of said telephone answering device when the telephone set is reset on-hook after it is set off-hook.

4. A multifunctional telephone answering device connectable to a telephone line, comprising:

outgoing message generator means responsive to a play message signal for supplying an outgoing message to said telephone lines;

incoming message recording means responsive to a record control signal for recording an incoming message from said telephone line;

a ring detector connected to said telephone line for detecting a ring signal and, in response, providing a call detect signal;

a telephone instrument status detector for detecting an on-hook/off-hook status of a telephone instrument connected to said telephone line and, in response, providing a hook status signal;

first timer means responsive to said call detect signal and said hook status signal for defining a first time period initiated in response to said ring detector detecting a ring signal and said telephone instrument detector detecting an on-hook status of said telephone instrument;

first outgoing message initiation means for supplying said play message signal for initiating said outgoing message on said telephone line in response said telephone instrument status detector continuously detecting an on-hook condition of said telephone instrument during said first time period;

second timer means responsive to said play message signal supplied by said first outgoing message initiation means for defining a second time period;

first message recording control means responsive to said hook status signal supplied during said second time period for supplying said record control signal when an on-hook condition is detected during said second time period;

third timer means responsive to said call detect signal and said hook status signal for defining a third time period initiated in response to said ring detector detecting a ring signal and said telephone instrument status detector detecting an off-hook status of said telephone instrument prior to expiration of said first time period;

second outgoing message initiation means for supplying said play message signal for initiating said outgoing message on said telephone line in response said telephone instrument status detector detecting an on-hook condition of said telephone instrument during said third time period; and second message recording control means responsive to completion of said outgoing message initiated by said second outgoing message initiation means for supplying said record control signal.

5. A telephone answering device connectable to a telephone line, comprising:

outgoing message genrator means for supplying an outgoing message to said telephone line;

a ring detector connected to said telephone line for detectign a ring signal;

ring counter means responsive to said ring detector for counting a predetermined number of said ring signals;

a telephone instrument status detector for detecting an on-hook/off-hook status of a telephone instrument connected to said telephone line; and reactivation means for activating said outgoing message generator means in response to detecting an off-hook status prior to said ring counter counting said predetermined number of ring signals followed by detection of an on-hook status within a first predetermined time period thereafter.

6. The telephone answering device of claim 5, further comprising:
incoming message recording meands signal for recording an incoming message from said telephone line;
incoming message initiation means for activating said incoming message recording means in response said telephone instrument status detector detecting an on-hook condition within a second predetermined time after completion of said outgoing message.

* * * * *

UNITED STATES PATENT AND TRADEMARK OFFICE
CERTIFICATE OF CORRECTION

PATENT NO. : 5,138,652
DATED : August 11, 1992
INVENTOR(S) : Kazuo HASHIMOTO

It is certified that error appears in the above-identified patent and that said Letters Patent is hereby corrected as shown below:

```
     Column 6, line 22, after "response" insert --to--;
              line 43, after "response" insert --to--;
              line   56,   change   "detectign"   to--
detecting--.
     Column 7, line 3, after "recording" delete meands
and insert --means responsive to a record control--.
     Column 8, line 1, after "response" insert --to--.
```

Signed and Sealed this

Ninth Day of November, 1993

Attest:

BRUCE LEHMAN

Attesting Officer     Commissioner of Patents and Trademarks